United States Patent

[11] 3,617,893

[72] Inventor Allan J. Bell Fairport, N.Y.
[21] Appl. No. 789,087
[22] Filed Jan. 2, 1969
[45] Patented Nov. 2, 1971
[73] Assignee Xerox Corporation Rochester, N.Y.

[54] FREQUENCY MODULATED SIGNAL GENERATOR
7 Claims, 2 Drawing Figs.

[52] U.S. Cl. 325/145, 178/66
[51] Int. Cl. H04b 1/04
[50] Field of Search 178/66, 67, 66 A; 325/145, 163, 30, 55, 64; 331/179; 340/207, 208, 189

[56] References Cited

UNITED STATES PATENTS

| | | | |
|---|---|---|---|
| 3,458,835 | 7/1969 | Saeger | 178/66 |
| 3,142,723 | 7/1964 | Fleming | 325/163 |

*Primary Examiner*—Robert L. Griffin
*Assistant Examiner*—Anthony H. Handal
*Attorneys*—James J. Ralabate, John E. Beck and Franklyn C. Weiss

ABSTRACT: In a data communication system a modulator for use in generating frequency modulated signals. A plurality of frequencies is generated in response to information and other supervisory signals applied thereto by utilizing logic and other type circuitry in accordance with a predetermined priority of input signals.

INVENTOR.
ALLAN J. BELL
BY Franklyn C. Weiss
ATTORNEY

FREQUENCY MODULATED SIGNAL GENERATOR

BACKGROUND

In prior art facsimile systems documents to be transmitted are scanned at a transmitting station to convert information on the document into a series of electrical signals,. These video signals are then coupled to the input of a communication link interconnecting a transmitter with a receiver. At a receiving location video signals selectively control the actuation of appropriate marking means to generate a facsimile of the document transmitted.

Data transmission in such a system is often accomplished by the use of the technique known as frequency modulation wherein the information is transmitted by assigning a different carrier frequency to each state of the data, i.e., mark and space, and transmitting the appropriate frequency for a period of time sufficient to insure reliable detection. Where the information includes levels of gray between the mark and space, or black and white signals, the frequency modulation signal is transmitted in a range between two limits of frequency, the frequencies therebetween relating directly to the level of gray detected and transmitted.

Transmission of the frequency modulated or frequency shift-keyed signal may be accomplished over any of the known transmission media, such as common carrier telephone lines, microwave installations, and direct wire, etc. At a receiving location the frequency modulated signals would be demodulated and detected in order to recover the original transmitted information.

Prior art techniques of transmitting a variable frequency between two outer limits include the technique of utilizing a voltage controlled oscillator. A voltage controlled oscillator generates different frequencies over a predetermined range in direct relation to the voltage applied to it. In a facsimile transmitter, for example, video information in accordance with the information printed on a document or the like would be transmitted by such a use of a frequency modulated signal. However, other signals must be transmitted along with the video information signals in order to control or indicate to the receiving facsimile unit certain supervisory and other control signals necessary for the efficient and complete operation of the facsimile system. These signals occur in a predetermined sequence of priority in that a signal of first priority would be transmitted in lieu of a signal of second or lower priority.

OBJECT OF THE INVENTION

It is, accordingly, an object of the present invention to provide an improved frequency modulated signal modulator in a data communication system.

It is another object of the present invention to improve the performance of a data transmission system utilizing frequency modulation.

It is another object of the present invention to provide a frequency modulated signal in accordance with input signals of a predetermined priority of operation.

It is another object of the present invention to provide a frequency modulation circuit in a facsimile communication system in accordance with video and other supervisory signals in accordance with a predetermined priority of inputs.

BRIEF SUMMARY OF THE INVENTION

In accomplishing the above and other desired aspects, Applicant has invented novel apparatus for transmitting frequency modulated signals in accordance with input signals of different priority of importance. Utilizing a multivibrator circuit coupled to a transducer driving circuit, frequency modulated signals are generated by the application of predetermined voltages to the multivibrator. The control circuitry for the multivibrator is established to allow input signals with different priorities to effectively control the operation of the multivibrator. That is, in a facsimile communication system the video signal would have the lowest priority to operate the multivibrator. Other supervisory signals in conjunction with the circuitry disclosed hereinafter override the video and in turn have internal priorities therewith which when applied to the multivibrator circuit generate voltages and thus frequencies of different value.

DESCRIPTION OF THE DRAWINGS

For a more complete understanding of the invention, as well as other objects and further features thereof, reference may be had to the following detailed description in conjunction with the drawings wherein.

DETAILED DESCRIPTION OF THE INVENTION

Figure 1:
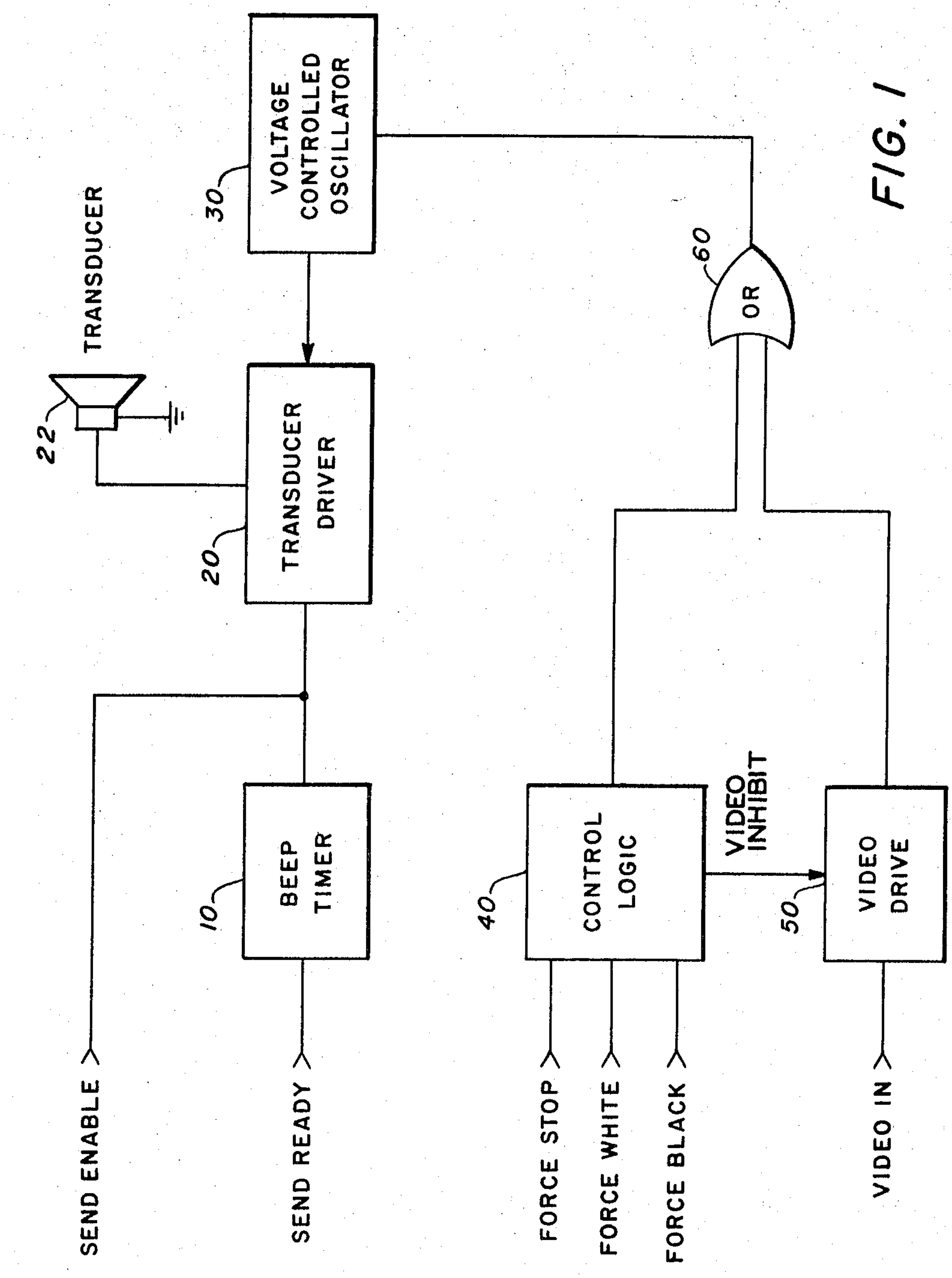
FIG. 1 is a block diagram of the modulator in accordance with the principles of the present invention.

FIG. 1 shows the overall block diagram of the frequency modulation system of the present application. Voltage controlled oscillator 30 generates the frequency signals in response to the voltage levels applied to it. The output from the voltage controlled oscillator 30 is coupled to the transducer driver 20 which is utilized to drive any sort of output device whether it be a data set, transducer for application to an acoustic or inductive coupler, etc. Allowing the transducer driver 20 to apply its signals to the transducer 22 is the send enable signal applied thereto which indicates that the facsimile or other unit is in the proper mode of operation. Also coupled to the transducer driver 20 is the beep timer 10 which transmits a frequency signal inside the video signal range for a short period of time to indicate to the operator or automatic circuitry at the receiving facsimile unit at a remote location that the transmitting unit is in the proper mode of operation and is ready to begin transmitting the video information. This send ready signal is generated when certain predetermined system status conditions are satisfied, such as paper is loaded, scanner door closed, etc.

The video signals are generated by a scanner of any known prior art design which in accordance with a predetermined raster presents light onto a document to be scanned. The information modulated reflected light is impinged upon a photocell or photomultiplier tube of any known design which generates an electric signal in response to the light input. The output from the photocell is applied to video drive circuit 50 which provides a current gain for the circuit. The video signal is a signal between two limits of voltage representing black and white and any shades of gray therebetween. The output from video drive circuit 50 is applied through OR-gate 60 and subsequently to the voltage controlled oscillator 30. As hereinabove described, the voltage controlled oscillator 30 generates a frequency in direct relation to the voltage applied to it. Thus, the scanner, not shown, generates light which is impinged on a photomultiplier tube which generates the outer limits of voltage representing the information on the document. The voltage controlled oscillator in response to the voltage levels applied to it generates the frequencies in accordance with the information on the document. The signals are applied to transducer driver 20 for subsequent transmission by transducer 22.

Also coupled to OR-gate 60 is the control logic 40 which generates the supervisory and other signals necessary for the operation of the system in conjunction with the priorities as hereinbefore described. During the initial operation of the circuit, the receiving facsimile unit must be synchronized and phased with the transmitting facsimile unit. Thus, during the first predetermined time period of the transmission, for example, 15 seconds, the scanner and circuits not shown will generate the white and black signals for coupling to control logic 40. That is, for the first initial period of time, hereinbefore set forth as 15 seconds, the scanner would transmit a forced black signal to the control logic 40 interrupted only by short pulses of white which are detected as, for example, a white paper gripper bar or scanning mirror at the end of each scan line. Thus, the white signal is generated between scan lines which is transmitted in priority to any video information that may be generated by the scanner to the OR-gate 60 and subsequently to the voltage controlled oscillator 30. The white and black signals would be the outer limits of voltages and thus frequency in the frequency band generated by the oscillator The short white signal in the long periods of black information in the 15-second time period is transmitted to the receiver which decodes the white signal and phases the receiving facsimile unit to this signal. After the 15-second time period the receiver should be phased with the transmitter and thus the normal transmission of video information can be commenced.

The signal with a first priority is the stop tone signal which is also coupled to the control logic 40. The stop tone indication signal, which is also another signal outside the frequency range of the video information, is generated in circuits, not shown, which come before the circuits seen in FIG. 1. That is, the stop tone is generated whenever the door to the facsimile unit is opened, or the scanner has reached the end of its travel, etc. The stop tone voltage is applied through OR-gate 60 to the voltage controlled oscillator 30 for subsequent transmission by transducer driver 20 and transducer 22. The stop tone which is a signal outside the video frequency range is decoded by the receiving facsimile unit and interrupts the operation of the receiving facsimile unit. Depending upon the priorities of the receiving unit to reestablish communication, a new transmission may have to be accomplished with the 15-second phasing sequence commenced again.

Figure 2:
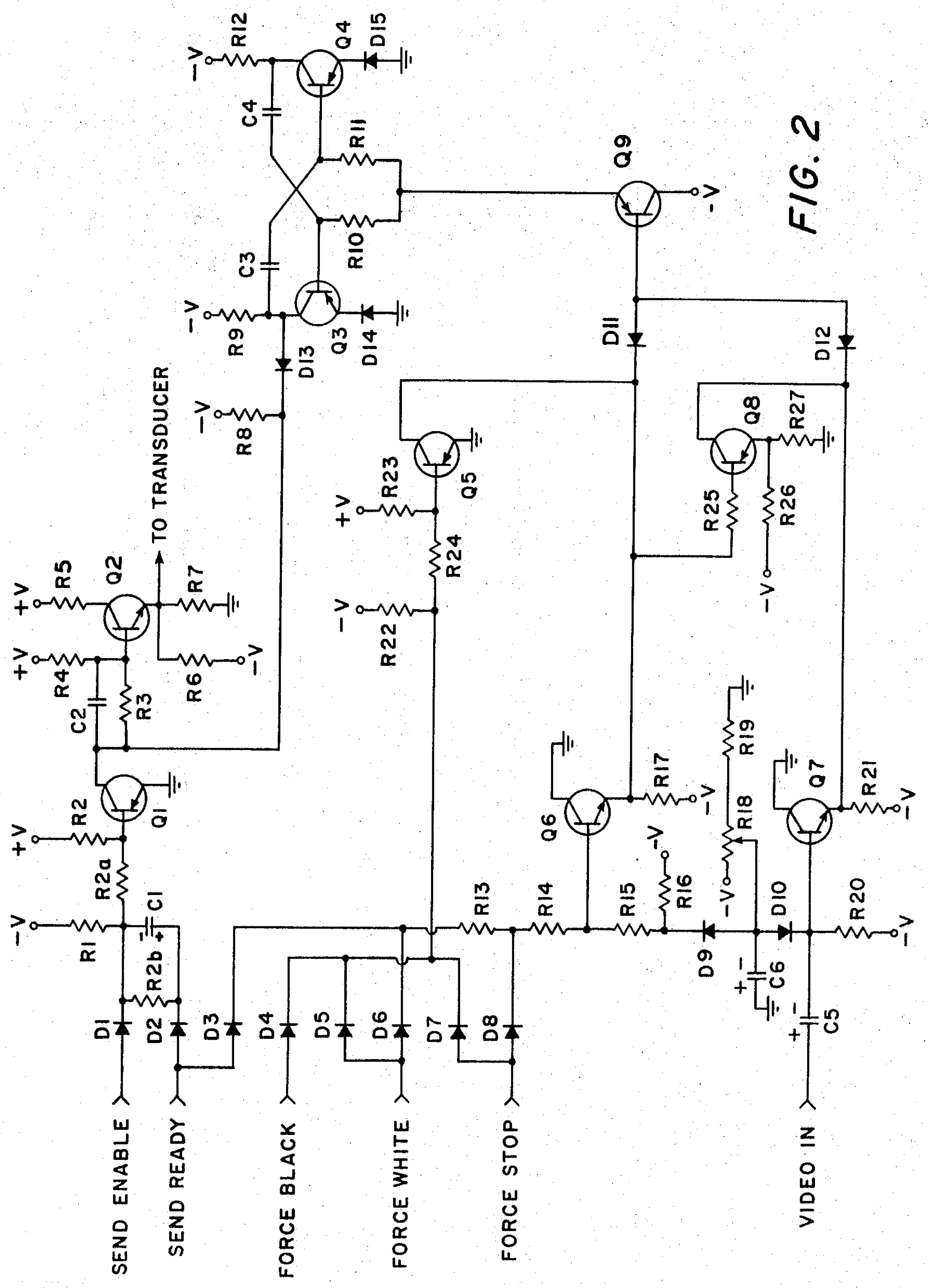
FIG. 2 is a schematic diagram of the block diagram of the modulator shown and described in FIG. 1.

Referring now to FIG. 2, there is shown the detailed circuit of the block diagram shown in FIG. 1. The video path as shown in FIG. 2 comprises the video input terminal through coupling capacitor C5 and applied to the base of transistor Q7. Transistor Q7 is wired as an emitter-follower circuit and comprises resistors R20 and R21 and provides an amplification factor approaching 1 with an attendant current gain in the circuit. If none of the other input signals are applied, the output from transistor Q7 is applied to transistor Q9 through diode D12. Q9 is also wired as an emitter-follower circuit. The voltage controlled oscillator of FIG. 1 is the multivibrator circuit comprising transistors Q3 and Q4 and associated resistors R9, R10, R11 and R12, and capacitors C3 and C4. Diodes D14 and D15 provide current flow only in the path shown through the emitters of transistors Q3 and Q4 and, in addition, provide a fixed voltage drop between the emitters and ground. The multivibrator circuit provides different frequencies dependent upon the input voltage applied to the junction of resistors R10 and R11. Resistors R10 and R11 are coupled to capacitors C4 and C3, respectively, and it is the charging and discharging rate of these capacitors in response to the input voltage that determines the frequency of oscillation of the multivibrator. The output from the multivibrator circuit is applied to diode D13 which in conjunction with resistor R8 supplies the output frequency to the transducer driver circuit comprising transistor Q2 and associated resistors R3, R4, R5, R6 and R7 with capacitor C2. Transistor Q2 is also coupled as a grounded emitter circuit and provides output current for subsequent use by a transducer or other component as hereinabove set forth.

The send enable circuit comprises transistor Q1 and associated resistors R1, **R2*a*, R2*b* and diode D1. Resistors R1 and R2 comprise a bias circuit which when an input to the anode of diode D1 is at ground a positive voltage appears at the base of transistor Q1 thereby disabling the transistor Q1. When this transistor is disabled there is no longer a direct connection to ground through the transistor and the frequencies generated by the multivibrator circuit are now able to be coupled to the base of transistor Q2**.

The beep timer circuit as seen in FIG. 1 comprises the same circuit as the send enable circuit with the addition of resistor **R2*b*, capacitor C1 and diode D2. Capacitor C1 and resistors R1 and R2*a* comprise an RC time constant circuit which the capacitor thereof attempts to charge to the negative voltage coupled to resistor R1. The send ready signal is applied to the anode of diode D2, thus giving capacitor C1 an opportunity to charge toward the negative voltage supply. Diode D1 is never grounded at the same time as diode D2, as D2 is used only in the "receive" mode and D1 is only used in the "send" mode. The RC charging rate of the capacitor C1 is applied to the base of transistor Q1 and out over the line as frequency tones through transistor Q2**.

The above paragraph has noted the normal path of video with the send enable and the send ready signals. Noted previously, however, are the force stop, force white, and force black signals to be transmitted separately from the video signals for purposes of supervisory, monitoring and control functions. If the video in signal is to be considered as a fourth priority signal, then the force white and force black are the second and third priority signals, respectively. The force black, as hereinabove set forth, occurs during the first 15-second time period, and is essentially a ground connection placed on the anode of diode D4. This ground condition is coupled to the circuitry of transistor Q5 and associated resistors R22, R23, and R24. Resistor R22 is coupled to a negative voltage supply, while resistor R23 is coupled to a positive voltage supply. With predetermined resistance values the circuit operates in conjunction with transistor Q5 as an inverter circuit in that with no signal applied to the resistors, as when no ground condition exists on the anode of diode D4, the signal level at the collector of transistor Q5 is at ground potential. When, however, the diode D4 receives the ground condition, as when a force black condition exists, the output at the collector of transistor Q5 goes to a negative voltage determined by the negative voltage supply and the value of resistor R17. The transistor Q6, now forward biased through its base-emitter junction allows current to flow through resistor R17 from ground to the negative voltage supply. This voltage now appearing at the emitter forward biases transistor Q8 and associated resistors R25, R26, and R27. With transistor Q8 conducting, the video signal is shorted to ground while allowing the voltage on resistor R17 to be transferred via transistor Q9 to the multivibrator as the force black signal.

Of second priority is the force white signal. This signal, which is a ground indication, appears at the anodes of diodes D5 and D6. The ground condition through diode D5 activates transistor Q5 in a similar manner as that above. The ground condition, however, now appearing on diode D6 allows current to flow from ground through resistors R19, R18, diode D9, resistors R15, R14, R13, to ground through diode D6. With diode D11 now forward biased and D12 reverse biased, the video signal which may appear is effectively shorted out through transistor Q8 and the voltage appearing at the cathode of diode D11 is transferred via transistor Q9 to the multivibrator circuit.

Of first priority is the force stop signal which appears on the anodes of diodes D7 and D8. Again, transistor Q5 operates in a similar manner as that above with the ground state applied to it through diode D7. Diode D8, however, now applies a ground condition between resistors R13 and R14 thereby changing the voltage characteristics applied to transistor Q6. This voltage appearing again on resistor R17 is coupled through transistor Q9 to the multivibrator as a stop tone which is outside the frequency range of the video signal.

As can be deduced from the above discussions, there are two black voltages which are applied to the multivibrator. One is the force black voltage generated by placing a ground condition on the anode of diode D4 and the black video information appearing at the input on the video in line. In order to insure that these voltage levels are the same, the voltage divider circuit comprising resistors R18 and R19 coupled to ground is provided. With the source of negative supply coupled to resistors R16 and R18 current will flow to the grounds established at the force black, force white or force stop inputs thereby changing the voltage levels applied to the base of transistor Q6. The potentiometer R18 is initially adjusted to establish the video "black" voltage level on the base of Q7. This same level is also established on the base of Q6 through D9 and resistor R15. When the "force white" condition is desired, R13 is grounded through D6. The voltage divider R15, R14 and R13 then provides the correct voltage on the base of transistor Q6 to establish the "white" frequency. "Force stop" is similarly accomplished by providing a ground to R14 through D8. The voltage divider R15 and R14 establish the voltage for the "stop" frequency.

Therefore, by providing merely one potentiometer all the other voltage levels can be adjusted and be within tolerance of the precision resistors. In this manner the voltages applied to the multivibrator which also has its limits of tolerance, will be the same for the force black and the video black signals appearing in the system. Therefore, merely by adjusting potentiometer R18, the output of the multivibrator circuit will be essentially the same for both black levels appearing throughout the system in FIG. 2. Capacitor C6 is coupled between diodes D9 and D10 in order to filter out any transients in the voltage levels that may appear due to video loading.

In the foregoing there has been disclosed apparatus for effectively providing a frequency modulated signal in accordance with input video information and other supervisory signals in a predetermined priority order. The specification has been drawn to a facsimile communication system with a predetermined time interval for phasing, etc., and additionally including information as to paper supply, scanners, etc. It will be apparent, however, that these recitations will be understood to one skilled in the art to be illustrative as other facsimile or data communication apparatus could be utilized within the scope of the invention. Moreover, while the invention has been described with reference to specific embodiments, it will be understood by those skilled in the art that various changes may be made and equivalents may be substituted for elements thereof without departing from the true spirit and scope of the invention. In addition, many modifications may be made to adapt a particular situation without departing from the essential teachings of the invention.

What is claimed is:

1. Apparatus for transmitting frequency modulated signals comprising:

oscillator means for generating frequency signals in response to voltages applied thereto, first circuit means for generating a range of voltages between a first and second limit thereof in response to information signals applied thereto, second circuit means for generating voltages in a said sequence are greater than the priority of said range of voltages from said first circuit means, in response to a plurality of supervisory, monitoring and control signals applied thereto, and third circuit means for applying said generated voltages from said first and second circuit means to the input of said oscillator means to control said oscillator means in said sequence of predetermined priority.

2. The apparatus as set forth in claim 1 wherein said plurality of supervisory signals includes a first input signal for generating a voltage level outside the first and second limits of voltage corresponding to said information signals and being of a first priority, a second input signal for generating a voltage level at the first limit of voltage corresponding to said information signals and being of a second priority, a third input signal for generating a voltage level at the second limit of voltage corresponding to said information signals and being of a third priority, said information signals being of a fourth priority and wherein said first and second circuit means further includes means for detecting said input supervisory and information signals and transferring the voltage levels generated to said oscillator means according to said predetermined first, second, third, and fourth priorities.

3. The apparatus as set forth in claim 2 further including voltage divider means coupled to said first and second circuit means for establishing the levels of said voltages from said voltage level established by said third input supervisory control signal.

4. The apparatus as set forth in claim 1 further including voltage divider means coupled to said first and second circuit means for establishing the levels of said voltages from said voltages established by one of said plurality of supervisory control signals.

5. The apparatus as set forth in claim 1 wherein said oscillator means is a voltage controlled multivibrator.

6. The apparatus as set forth in claim 5 further including:

means coupled to said multivibrator for transmitting said frequency modulated signals, and fourth circuit means coupled to said transmitting means for controlling the operation of said transmitting means to transmit said frequency modulated signals in response to an external enabling signal.

7. The apparatus as set forth in claim 6 further including:

means coupled to said fourth circuit means for transmitting a signal of frequency outside the first and second limits of frequency of said information signals during a period absent other transmission of frequency signals.

* * * * *

PO-1050
(5/69)

UNITED STATES PATENT OFFICE
CERTIFICATE OF CORRECTION

Patent No. 3,617,893 Dated November 2, 1971

Inventor(s) Allan J. Bell

It is certified that error appears in the above-identified patent and that said Letters Patent are hereby corrected as shown below:

Column 5, line 46, after "a" insert --sequence of predetermined priority, wherein the priorities of--.

Signed and sealed this 19th day of December 1972.

(SEAL)
Attest:

EDWARD M.FLETCHER,JR.
Attesting Officer

ROBERT GOTTSCHALK
Commissioner of Patents